United States Patent Office 3,837,977
Patented Sept. 24, 1974

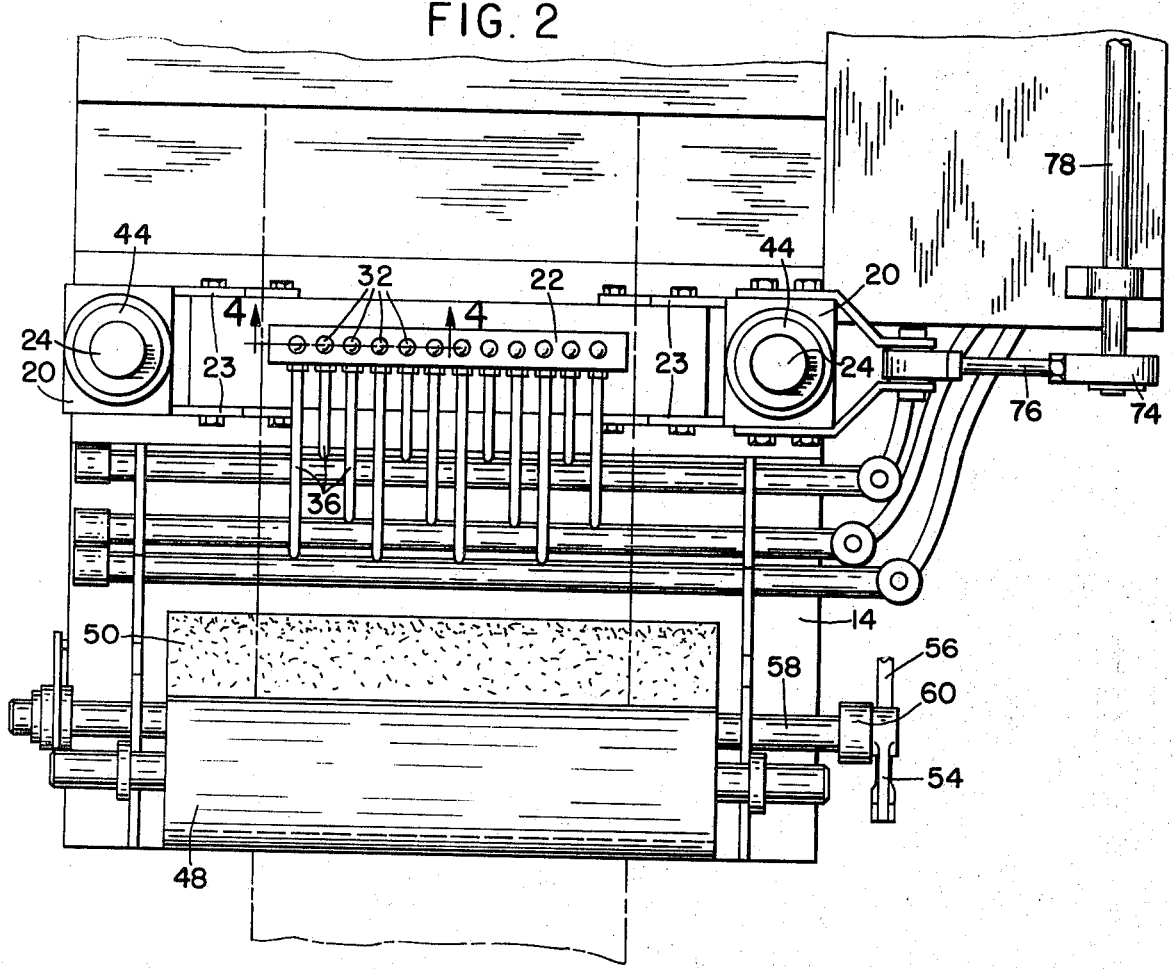

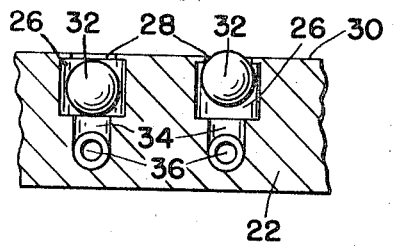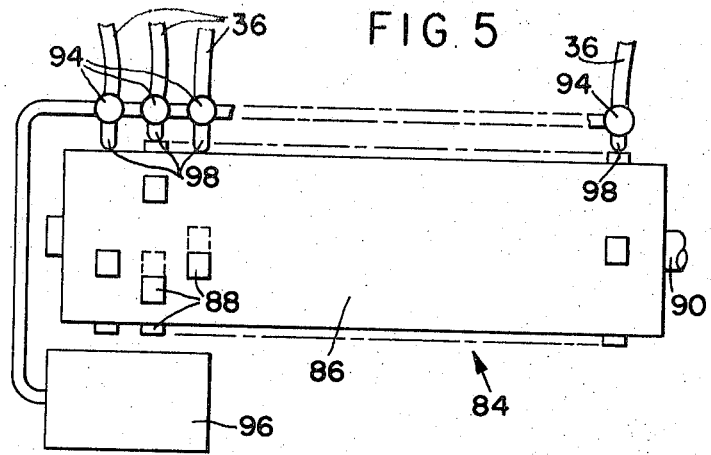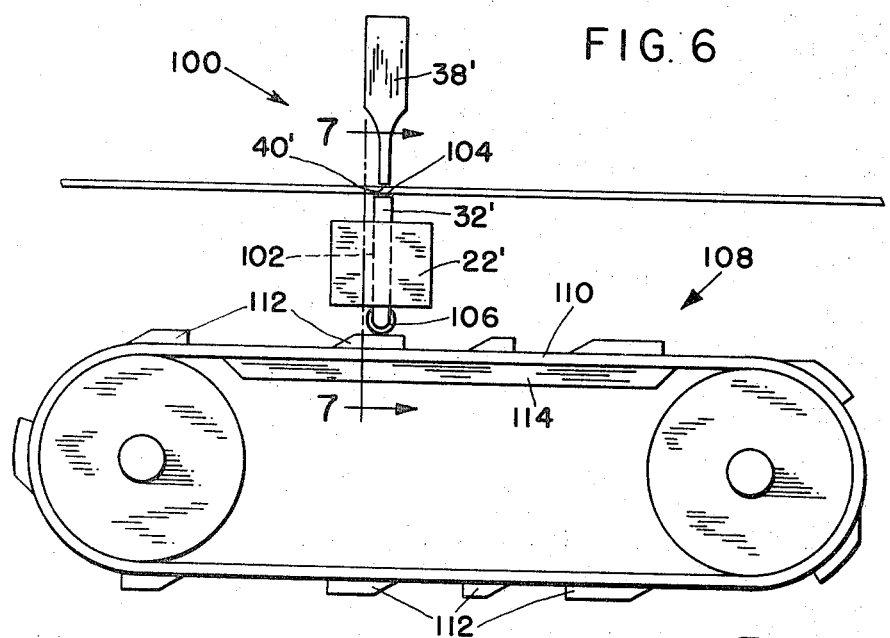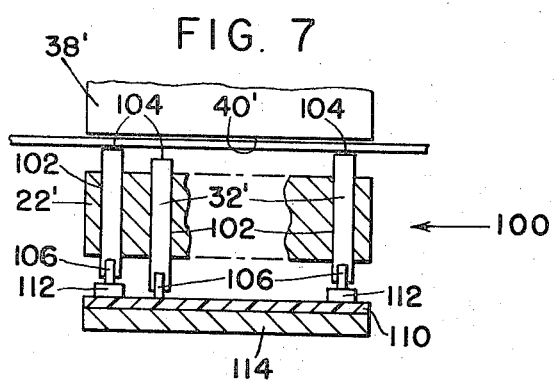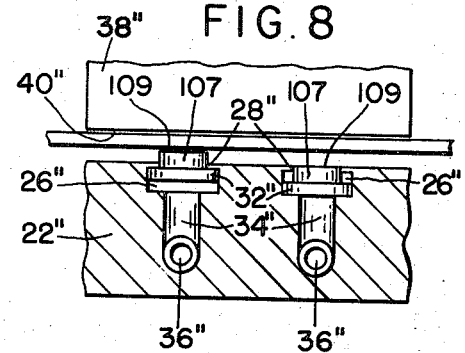

3,837,977
ULTRASONIC PATTERN WELDING APPARATUS
Edgar C. Rust, Jr., Williamstown, Mass., assignor to Crompton & Knowles Corporation, New York, N.Y.
Filed Sept. 15, 1972, Ser. No. 289,508
Int. Cl. B06b 3/00
U.S. Cl. 156—580        13 Claims

ABSTRACT OF THE DISCLOSURE

Apparatus for ultrasonic welding of thermoplastic sheets wherein a plurality of spaced anvils cooperate with a vibration transmitting member to produce welds in the sheets in a predetermined pattern. The apparatus includes control means for selectively moving the anvils into cooperative position with the vibration transmitting member.

BACKGROUND OF THE INVENTION

This invention relates to mechanism for welding thermoplastic sheets in a pattern by means of ultrasonic vibration equipment. The welded sheets may be used for such products as: Upholstery material, blankets, table covers, sleeping bags, and many other articles.

This invention represents an improvement over the commonly assigned U.S. application Ser. No. 207,322, filed Dec. 13, 1971 in my name jointly with Delmar D. Long and Stanley L. Lawrence, and entitled Apparatus for Vibration Welding of Sheet Materials, now U.S. Pat. No. 3,733,238.

The above-identified application discloses means for pattern welding thermoplastic sheets wherein anvils which are arranged in a pattern are conveyed into a cooperative position with vibration transmitting means.

SUMMARY OF THE INVENTION

The present invention provides spaced anvils which are selectively brought into and out of cooperative position with the vibration transmitting means by separate control means. In this way, the opposing surfaces of the anvil and vibration transmitting member may always be in alignment and the control means effective to selectively move the anvil toward and away from the vibration transmitting member. The welds are therefore more uniform.

Another advantage is that the patterns can be changed more easily since the anvils do not have to be replaced.

There are many other advantages which provide for greater patterning versatility which will become apparent upon a reading of the following detailed description.

BRIEF DESCRIPTION OF THE DRAWINGS

FIG. 2 is a plan view thereof;

FIG. 3 is a vertical section along line 3—3 of FIG. 1, looking in the direction of the arrows;

FIG. 4 is a fragmentary section along line 4—4 of FIG. 2, looking in the direction of the arrows and showing the anvils in detail;

FIG. 5 is a diagrammatic view of the control means for selectively moving the anvils;

FIG. 6 is a diagrammatic side elevation of a modification;

FIG. 7 is a fragmentary section along line 7—7 of FIG. 6 looking in the direction of the arrows; and FIG. 8 is a view similar to FIG. 4 showing modified anvils.

DETAILED DESCRIPTION OF THE INVENTION

Figure 1:
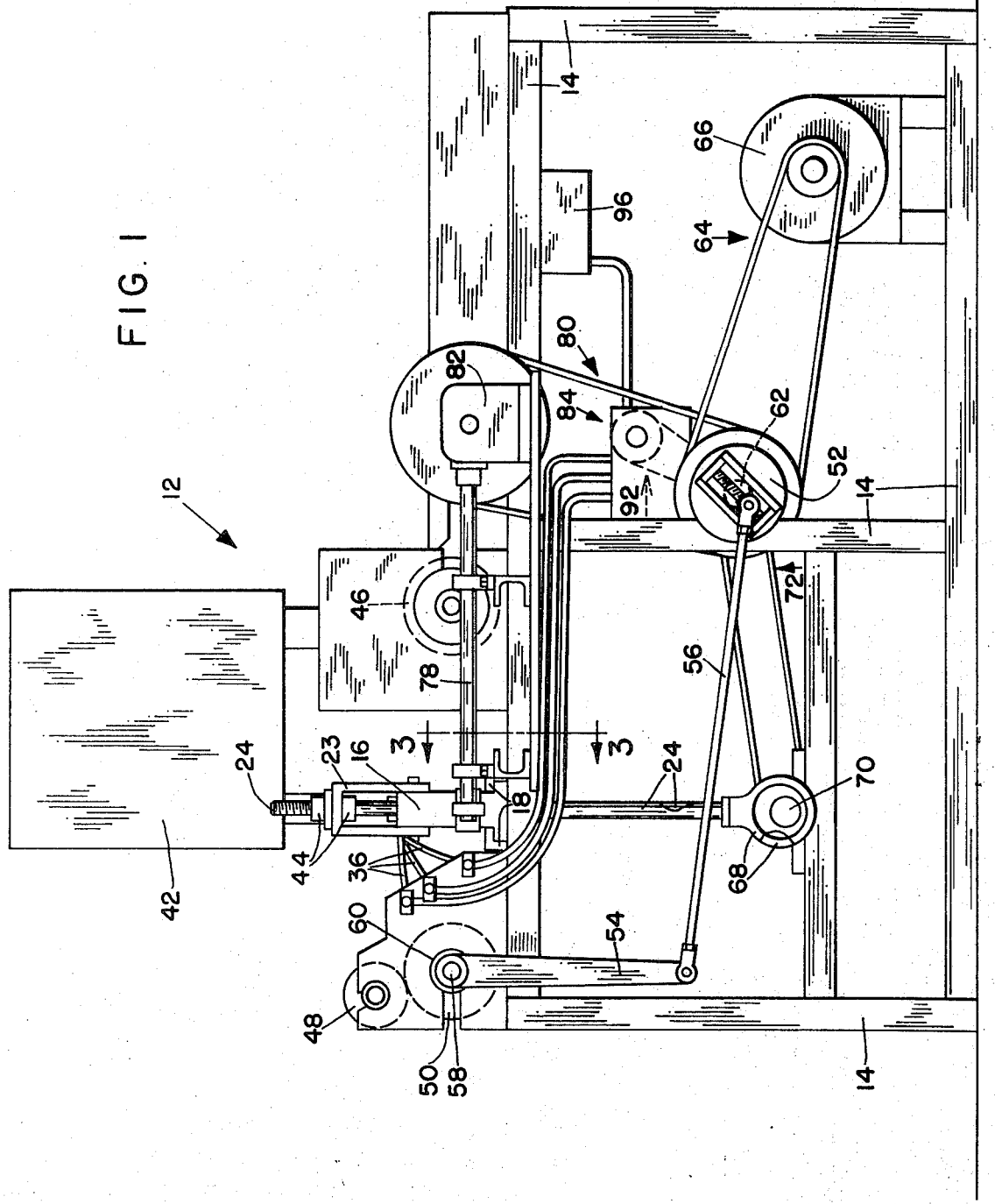
FIG. 1 is a side elevation of the preferred embodiment of the present invention.

Referring to FIGS. 1–4, a machine embodying the present invention is indicated generally at 12 and includes a supporting framework 14. A sliding base 16 is slidably mounted on top of the framework and is guided by slotted plates 18.

Sliding base 16 has a pair of vertically extending end portions 20; see FIG. 3. An anvil holder 22 is located between portions 20 and is supported by U-shaped brackets 23, which extend from a pair of vertical threaded rods 24 which extend freely through respective end portions 20. Brackets 23 and rods 24 form supporting means for the anvil holder 22 for a purpose to be described.

Referring particularly to FIG. 4, anvil holder 22 contains a plurality of annular cavities 26 which are connected to the outside through openings 28 in the upper surface 30 of member 22. An anvil 32 in the form of a sphere is loosely positioned in each cavity and is free to move up and down within the cavity but is constrained since opening 28 is smaller in diameter than anvil 32. However, each anvil will be below surface 30 in its lower position as shown in the left-hand portion of FIG. 4 and above surface 30 in its upper position as shown in the right-hand portion of FIG. 4. There is an opening 34 in the lower portion of each cavity which is connected to a pneumatic conduit 36. Pressurized air is selectively supplied through conduit 36 from means to be described to selectively force the anvils to their upper positions. In the absence of pressurized air, the anvils will fall to their lower positions by gravity. It is anticipated that springs could be utilized to assist the downward motion of the anvils. Base 16 is given a reciprocating motion to the left and right as viewed in FIG. 3 by means to be described.

An ultrasonic vibration transmitting member 38 is located above anvil holder 22 and has a lower working surface 40 which is aligned with anvils 32. When thermoplastic sheet material is passed between surface 40 and anvils 32 when they are in their upper position, the anvils cooperate with surface 40 to produce welds in the material. Member 38 is supported from a transducer unit 42 or the like and may be constructed as shown in U.S. Pats. 3,113,225 to Kleesattel et al. or 3,562,041 to C. A. Robertson. If a wider machine is desired, several vibration transmission members would be used as shown in the abovementioned application, Ser. No. 207,322.

Anvil holder 22 may be adjusted vertically with respect to surface 40 to accommodate different thicknesses of thermoplastic sheets. The upper ends of brackets 23 are freely slidable on rods 24 and are held in position by upper and lower threaded collars 44. Holder 22 can thereby be raised or lowered by turning collars 44.

The thermoplastic sheets to be welded are fed over a guide roll 46 from a source of supply, not shown. The sheets pass between anvil holder 22 and member 38 to a pair of upper and lower take-up rolls 48 and 50, respectively. A crank 52 reciprocates a lever 54 through a connecting rod 56. The reciprocation of lever 54 imparts intermittent motion to a shaft 58 through a ratchet gearing unit 60. Roll 50 is fixed to shaft 58 and is thereby rotated intermittently to draw the sheet material between anvil holder 22 and member 38 intermittently. Crank 52 is located on a shaft 62 which is driven by a belt and pulley drive generally indicated at 64 from a motor 66. Crank 52 is also adjustable to vary the amount of reciprocation imparted to lever 54. If it is desired to feed the sheet material continuously, roll 50 can be rotated continuously by driving shaft 58 directly from shaft 62 through a pulley and belt drive similar to 64.

Rods 24 are mounted on eccentrics 68 which are mounted on a shaft 70 which is rotatably driven from shaft 62 through a pulley and belt drive generally indicated at 72. Rods 24 are reciprocated vertically by eccentrics 68 to move anvil supporting member toward and away from member 38. The motion is such that anvils 32 are brought into and out of cooperating position with surface 40. This motion is in synchronism with the intermittent motion of take-up roll 50. Anvils 32 are brought into cooperating position with surface 40 when the thermoplastic sheets are stationary and moved away therefrom when the sheets are advanced by rolls 48 and 50.

The invention also includes means for reciprocating anvil holder 22 along an axis which is parallel to the surface 40 of vibration transmitting member 38 and transverse to the longitudinal axes of the sheets to produce a pattern variation. This motion is achieved by a crank 74 which is connected to sliding base 16 by a connecting rod 76. Crank 74 is driven by a shaft 78 which is rotatably driven from shaft 62 through a belt and pulley drive 80 and right angle drive 82. Drive 82 may be a gear reducer so that each horizontal reciprocation of holder 22 may occur during several vertical reciprocations by means of drive 82. This ratio can be varied to produce more patterning variations. Drive 82 may also be a gear increasor so that each vertical reciprocation may occur during several horizontal reciprocations.

Eccentrics 68 are mounted on self-aligning bearings to allow rods 24 to swing due to the horizontal motion of base 16 along an axis transverse to the longitudinal axes of the sheets.

The movements of anvils 32 within holder 22 are controlled by control means generally indicated at 84; see particularly FIGS. 1 and 5.

Control means 84 includes a pattern drum 86 which has a plurality of projections 88 arranged in a predetermined pattern. Drum 86 is fixed to a shaft 90 which is driven from shaft 62 through a belt and pulley drive generally indicated at 92.

Control means 84 also includes actuating means which comprise a plurality of air valves 94 pneumatically connected to a source of compressed air 96. Valves 94 are connected to previously-described conduits 36. As shown in the drawings, there is one valve and one conduit for each anvil 32. If desired, several conduits from within holder 22 could be connected to a single conduit and controlled by a single valve. However, the condition shown wherein each anvil is individually controlled provides the most patterning versatility. Each valve has a plunger 98 which, when depressed, "opens" the valve to connect its corresponding conduit 36 to the source of compressed air. As drum 86 is rotated, projections 88 are brought into contact with plungers 98 and are effective to open the valves in accordance with a prearranged pattern. The rotation of drum 86 is synchronized with other previously-described motions so that patterning changes occur during periods when anvil holder 22 is in its lower inactive position.

The invention also provides a further pattern variation by driving roll 50 continuously and disconnecting the drive 72 from shaft 62 to shaft 70 and maintaining rods 24 in the upper position. Projections 88 could be made of variable lengths along the circumference of the drum to maintain anvils 32 in cooperating position with surface 40 for varying time intervals. This will produce elongated weld spots in the sheets of variable lengths. If the lateral shifting of anvil holder 22 is maintained, these elongated welds will form a zigzag pattern; otherwise, they will extend lengthwise of the sheets.

It can be seen from the above discussion that the invention is capable of providing many patterning possibilities by employing different combinations of elements beyond those combinations described above.

FIGS. 6 and 7 illustrate a modification indicated generally at 100 wherein the pattern means acts directly on the anvils. As shown in FIGS. 6 and 7, apparatus 100 includes an anvil holder 22' located below a vibration transmitting member 38'. Elongated anvils 32' are slidably supported within holes 102 of anvil holder 22'. The upper portion of each anvil 32' extends above holder 22' and has a surface 104 which cooperates with a lower surface 40' of vibration transmitting member 38'. Surface 104 may have a variety of shapes if desired. The lower end of each anvil 32' has a follower 106 which extends below member 22'. A pattern device 108 is located below followers 106 and includes a conveyor 110 having projections 112 which are arranged in a predetermined pattern for selectively engaging followers 106 in accordance with said pattern. Conveyor 110 passes over a support 114 which is located below followers 106 so as to support the conveyor and enable it to transmit upward motion to the anvils 32'. If desired, a roll such as 86 as shown in FIG. 5 could be used instead of the conveyor, or a conveyor could be substituted for the roll 86 in the preferred form of the invention.

FIG. 8 discloses a further modification wherein an anvil holder 22'' may be substituted for holder 22 in the preferred embodiment of the invention. Holder 22'' has a plurality of cylindrical cavities 26'' which are connected to the outside through openings 28'' which are smaller in diameter than cavities 26''. Conduits 36'' are pneumatically connected to the lower portions of cavities 26'' through openings 34''. Anvils 32'' are cylindrical members which are slidably positioned in cavities 26''. Each anvil 32'' has a reduced portion 107 which has an upper surface 109 which cooperates with the lower surface 40'' of a vibration transmitting member 38'' to produce welds in thermoplastic sheet material placed between surfaces 40'' and 109. The anvils 32'' are controlled by control means in the same manner as anvils 32. When conduits 36'' are connected to a source of compressed air anvils 32'' are forced to their upper active position so that portions 107 extend through openings 28'' beyond the upper surface 30'' of holder 22'' as shown at the left side of FIG. 8. In the absence of pressurized air in the conduits 36''', anvils 32'' will drop to their lower inactive position as shown at the right side of FIG. 8. Only two anvils are depicted in FIG. 8, it being understood that there would be as many anvils as disclosed for the preferred embodiment.

I claim:

1. Apparatus for the ultrasonic joining of two or more sheets of thermoplastic material comprising:
   (a) at least one ultrasonic vibration transmitting member disposed on one side of said sheets;
   (b) means to advance said sheets relative to said vibration transmitting member;
   (c) an anvil holder located on the other side of said sheets, said holder being stationary with respect to movement in the direction in which said sheets are advanced;
   (d) a plurality of spaced unheated anvils movably supported by said anvil holders, said anvils being movable vertically into and out of an active position where they cooperate with said ultrasonic vibration transmitting member to produce spaced welds in a predetermined pattern in said sheets; and
   (e) control means for selectively moving said anvils vertically to produce a plurality of welds in said sheets in said pattern.

2. The apparatus as described in claim 1 where said control means comprises:
   (a) pattern means; and
   (b) actuating means under control of said pattern means for moving said anvils vertically.

3. The apparatus as described in claim 1 wherein each of said spaced anvils is independently movable.

4. The apparatus as described in claim 3 wherein said anvil holder has a plurality of cavities within which said anvils are slidably mounted for vertical movement and wherein said control means comprises:
   (a) pattern means; and
   (b) means under control of said pattern means for moving said anvils.

5. The apparatus as described in claim 3 wherein said anvil holder has a plurality of apertures extending vertically therethrough and said anvils are slidably mounted within said apertures, each anvil having a first portion which extends beyond said holder for cooperating with said vibration transmitting member and a second portion which extends beyond said holder for engagement with said control means.

6. The apparatus as described in claim 5 wherein said control means comprises cam surfaces arranged in a pattern for selectively engaging the second portion of said anvils.

7. The apparatus as described in claim 1 wherein said sheet advancing means are operative to advance said sheets intermittently.

8. Apparatus for the ultrasonic joining of two or more sheets of thermoplastic material comprising:
    (a) at least one ultrasonic vibration transmitting member disposed on one side of said sheets;
    (b) means to advance said sheets relative to said vibration transmitting member;
    (c) an anvil holder located on the other side of said sheets, said anvil holder having a plurality of spaced cavities;
    (d) a plurality of anvils slidably mounted within said cavities, said anvils being movable into and out of an active position where they cooperate with said ultrasonic vibration transmitting member to produce welds in said sheets;
    (e) pattern means;
    (f) a source of compressed air;
    (g) a pneumatic connection to each of said cavities; and
    (h) a valve associated with each of said pneumatic connections and operated by said pattern means for selectively connecting said cavities to said source of compressed air.

9. The apparatus as described in claim 8 wherein said valves are mechanically actuated and said pattern means are cam surfaces arranged in a pattern for selectively actuating said valves.

10. Apparatus for the ultrasonic joining of two or more sheets of thermoplastic material comprising:
    (a) at least one ultrasonic vibration transmitting member disposed on one side of said sheets;
    (b) means to advance said sheets relative to said vibration transmitting member;
    (c) an anvil holder located on the other side of said sheets, said holder being stationary with respect to movement in the direction in which said sheets are advanced;
    (d) a plurality of spaced unheated anvils supported by said anvil holder and located in a position for cooperating with said vibration transmitting member to produce welds in said sheets;
    (e) means for reciprocating said anvil holder vertically toward and away from said sheets so as to bring said anvils into cooperating position with said vibration transmitting member; and
    (f) means for reciprocating said anvil holder a distance less than the width of said sheets along an axis which is parallel to the surfaces of said sheets and transverse to the longitudinal axis of said sheets.

11. The apparatus as described in claim 10 wherein said sheet advancing means are operative to advance said sheets intermittently in synchronism with said reciprocating means so that said sheets are advanced when said anvils are out of cooperating position with said vibration transmitting member.

12. Apparatus for the ultrasonic joining of two or more sheets of thermoplastic material comprising:
    (a) at least one ultrasonic vibration transmitting member disposed on one side of said sheets;
    (b) means to advance said sheets relative to said vibration transmitting member;
    (c) an anvil holder located on the other side of said sheets, said holder being stationary with respect to movement in the direction in which said sheets are advanced;
    (d) a plurality of spaced unheated anvils supported by said anvil holder and located in a position for cooperating with said vibration transmitting member to produce welds in said sheets;
    (e) a stationary base;
    (f) a slider base mounted on said stationary base for sliding thereon along a horizontal axis which is parallel to the surfaces of said sheets and transverse to the longitudinal axis of said sheets;
    (g) means for reciprocating said slider base along its sliding axis;
    (h) means for supporting said anvil holder for movement with said slider base;
    (i) connecting means operatively connected to said anvil holder and mounted with respect to said slider base for movement along a vertical axis; and
    (j) means for reciprocating said connecting means along its vertical axis to bring said anvils into and out of cooperating position with said vibration transmitting member.

13. Apparatus for the ultrasonic joining of two or more sheets of thermoplastic material comprising:
    (a) at least one ultrasonic vibration transmitting member disposed on one side of said sheets;
    (b) means to continuously advance said sheets relative to said vibration transmitting member;
    (c) an anvil holder located on the other side of said sheets, said holder being stationary with respect to the direction in which said sheets are advanced;
    (d) a plurality of spaced unheated anvils supported by said anvil holder in contact with said other side of said sheets for cooperation with said vibration transmitting member to produce a plurality of spaced welds in said sheets;
    (e) means for reciprocating said anvil holder along an axis which is parallel to the surfaces of said sheets and transverse to the longitudinal axis of said sheets, a distance less than the width of said sheets; and
    (f) means for coordinating said means for advancing said sheets with said means for reciprocating said anvil holder so as to produce a plurality of spaced zigzag welds in said sheets.

References Cited
UNITED STATES PATENTS

| | | | |
|---|---|---|---|
| 3,733,238 | 5/1973 | Long et al. | 156—580 |
| 3,562,041 | 2/1971 | Robertson | 156—73 |
| 3,303,084 | 2/1967 | Schwanekamp et al. | 156—583 |
| 3,737,361 | 6/1973 | Obeda | 156—580 |

CHARLES E. VAN HORN, Primary Examiner

M. G. WITYSCHYN, Assistant Examiner

U.S. Cl. X.R.

156—73; 228—1; 264—23